Oct. 23, 1934.     G. FROVA     1,977,675
MACHINE FOR REMOVING PITS FROM FRUIT
Filed Jan. 31, 1933     9 Sheets-Sheet 1

GIOVANNI FROVA
INVENTOR
BY Haseltine, Lake & Co.
ATTORNEYS

Oct. 23, 1934.  G. FROVA  1,977,675
MACHINE FOR REMOVING PITS FROM FRUIT
Filed Jan. 31, 1933  9 Sheets-Sheet 2

GIOVANNI FROVA
INVENTOR
BY Haseltine, Lake & Co.
ATTORNEYS

Oct. 23, 1934.　　　　　.G. FROVA　　　　　1,977,675
MACHINE FOR REMOVING PITS FROM FRUIT
Filed Jan. 31, 1933　　　9 Sheets-Sheet 3
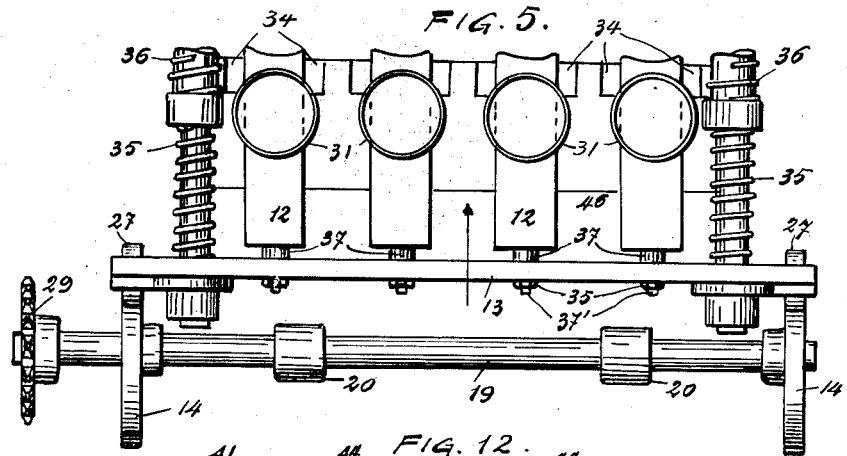
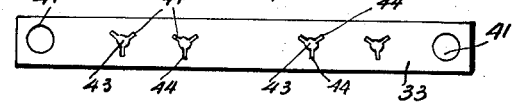
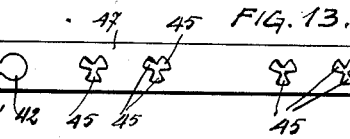
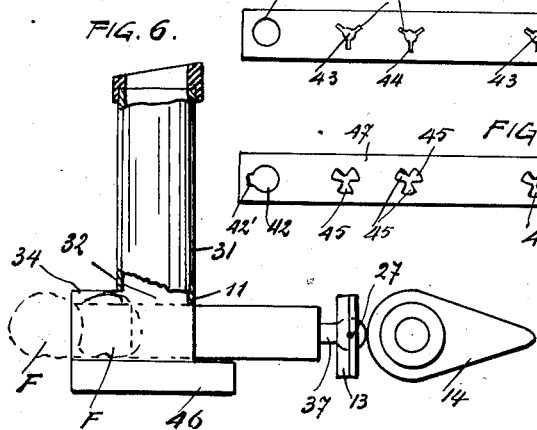
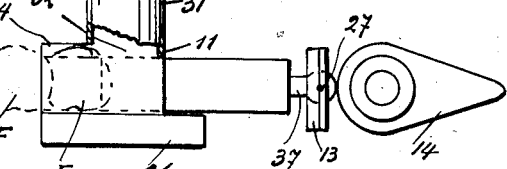
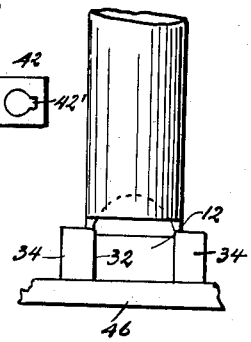
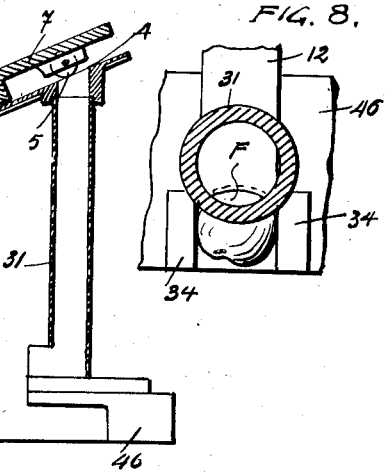
GIOVANNI FROVA
INVENTOR
BY *Haseltine, Lake & Co*
ATTORNEYS

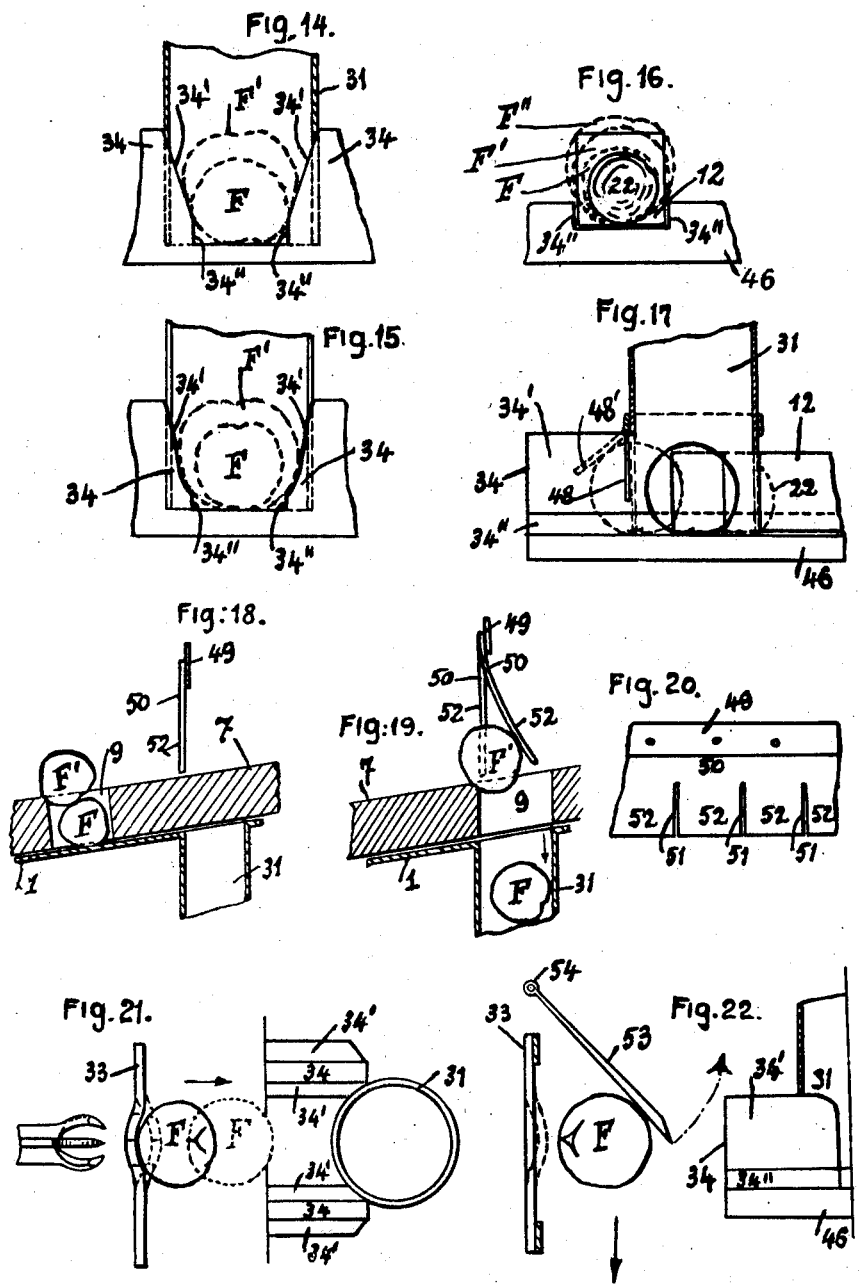

Oct. 23, 1934.  G. FROVA  1,977,675
MACHINE FOR REMOVING PITS FROM FRUIT
Filed Jan. 31, 1933  9 Sheets-Sheet 5
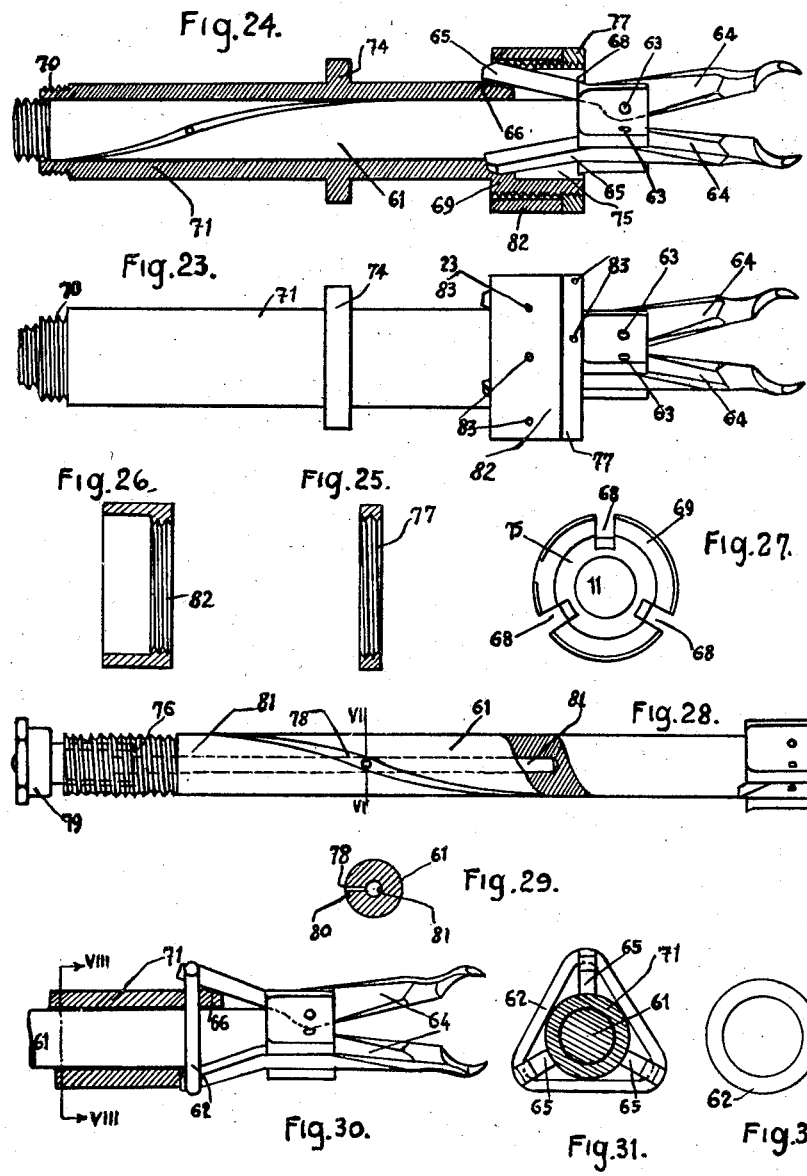
GIOVANNI FROVA
INVENTOR
BY Haseltine, Lake & Co.
ATTORNEYS Oct. 23, 1934.     G. FROVA     1,977,675
MACHINE FOR REMOVING PITS FROM FRUIT
Filed Jan. 31, 1933     9 Sheets-Sheet 6
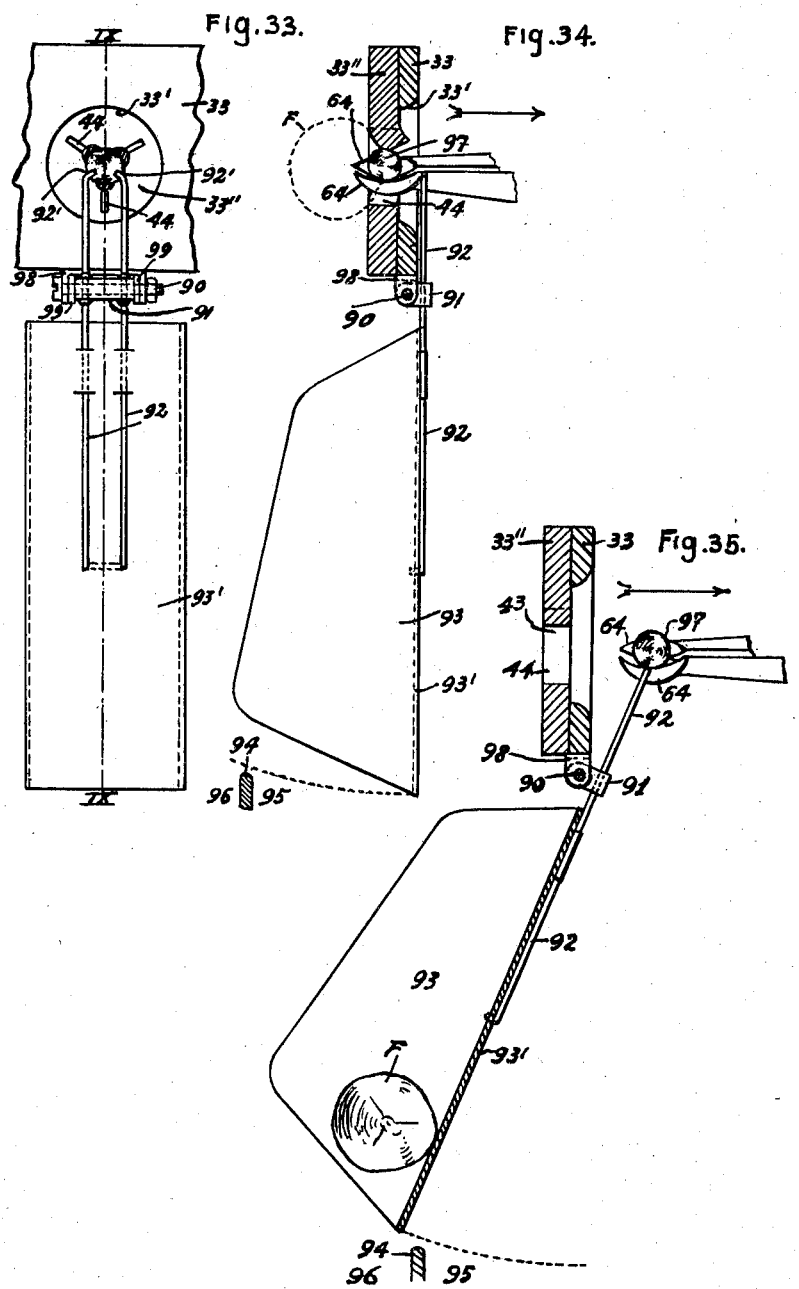

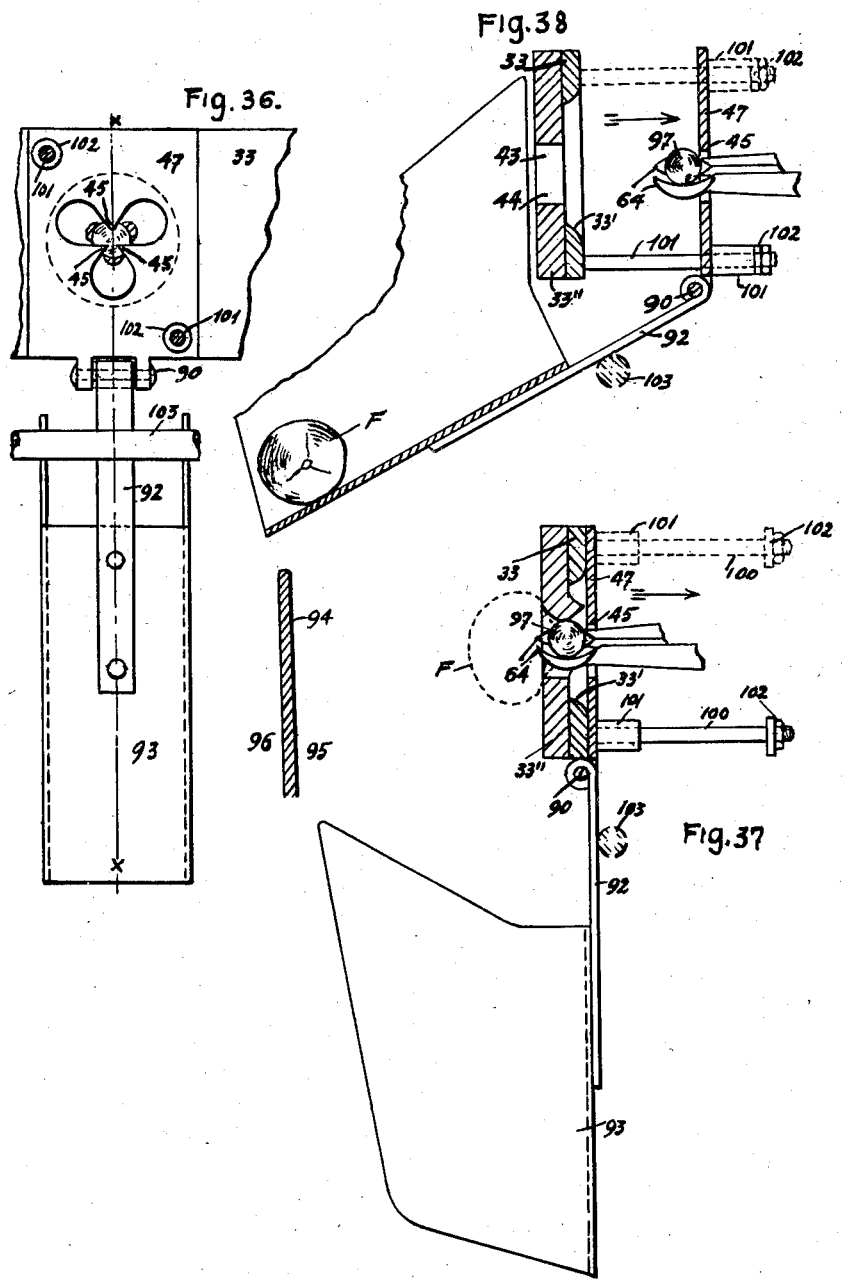

Oct. 23, 1934.　　　　G. FROVA　　　　1,977,675
MACHINE FOR REMOVING PITS FROM FRUIT
Filed Jan. 31, 1933　　9 Sheets-Sheet 8
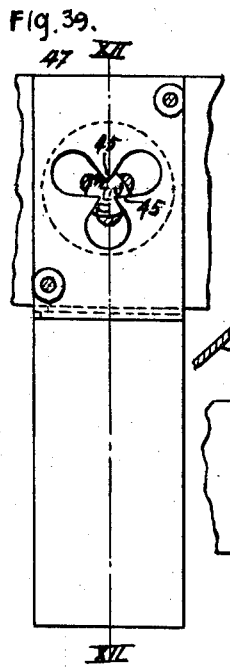
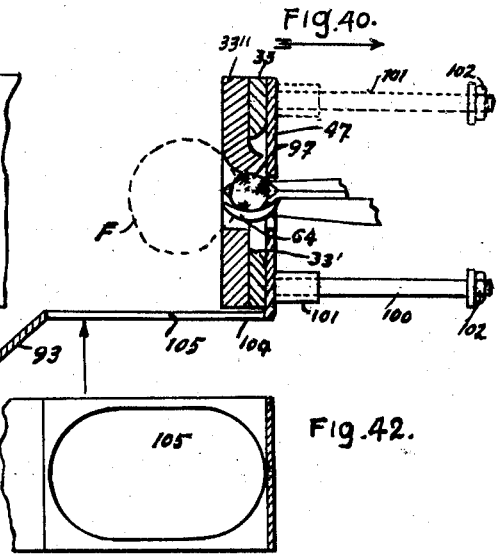
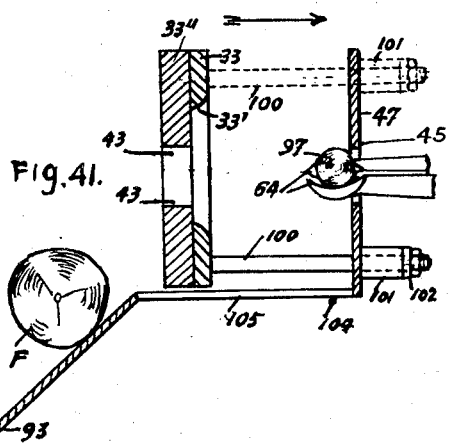
GIOVANNI FROVA
INVENTOR
BY Haseltine Lake & Co.
ATTORNEYS

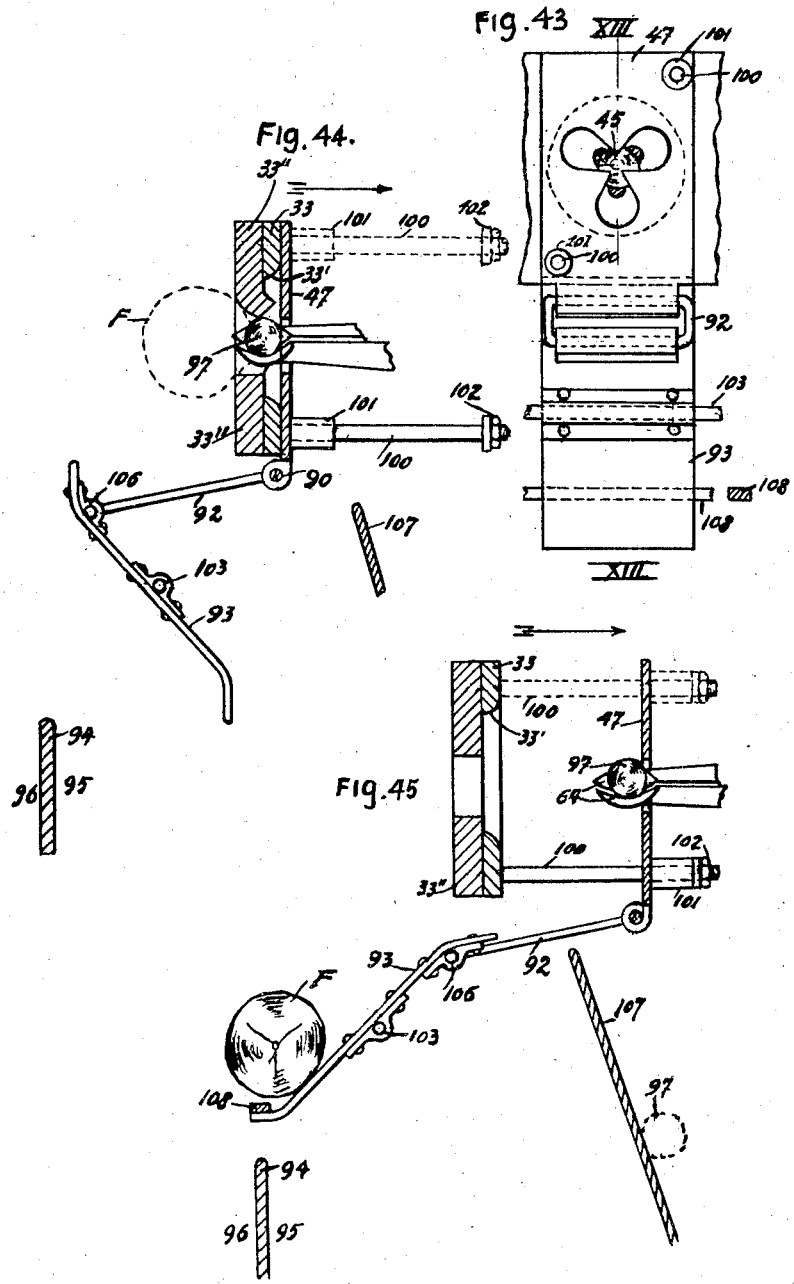

Patented Oct. 23, 1934

1,977,675

UNITED STATES PATENT OFFICE 1,977,675

MACHINE FOR REMOVING PITS FROM FRUIT

Giovanni Frova, Milan, Italy

Application January 31, 1933, Serial No. 654,472
In Italy February 2, 1932

17 Claims. (Cl. 146—18)

The present invention mainly relates to improvements to the type of machine for removing pits from fruit comprising:

(a) A hopper into which the fruit to be pitted are loaded hap-hazard, one or more holes being provided in the bottom of the hopper through which holes a single fruit can pass at a time;

(b) One or more fruit separating and distributing tubes, the open end of which connects up to each hole in the hopper bottom, while the closed lower end of the tube has an aperture formed in its wall through which only one fruit can pass at a time;

(c) Pit extracting tools in the form of pincers;

(d) Means for actuating the pit gripping and extracting tools;

(e) Two plates, one of which is destined to stop the movement of the fruit drawn by the pit gripping and extracting tools in order to permit the pit extraction, while the other plate serves to free the pit gripping shanks of said tools from the pit that have been removed from the fruit.

The practice has shown that the said machine, while generally fulfilling the objects for which it has been designed, yet involves some slight inconveniences.

In the said machine, namely:—

(1) In order to ensure the fall into the tubes of the fruits loaded on the hopper, manual assistance by the attendants is required;

(2) Sometimes it happens that some fruit, being of relatively small size, on dropping on the closed end of the respective distributing tube, disposes itself eccentrically with respect to the inner wall of the tube and, by one of its points, rests against a point of the tube wall, leaving a free space on the opposite side. The result is that, on the forward stroke of the gripping device, one shank only of this device encounters the pit and deviates it so that the other two shanks cannot grip it, and the pit cannot therefore be extracted;

(3) The transversal plates intended to stop the fruit withdrawn from the distributing tube and to release the pit from the shanks of the gripping device being stationary, it becomes necessary to give the gripping shanks an unduly great length, to the prejudice of their strength.

The present invention has for its object to remove the said inconveniences and provides means, actuated at the right time:

(A) To shake the fruits loaded hap-hazard on to the hopper in order to separate a certain number thereof from the mass and bring them, thus separated, over the apertures provided in the bottom of the hopper and connected to the distributing tubes, so that the fruits can drop into these tubes;

(B) To center the fruits that have dropped on to the bottom of each tube by means of reciprocating slides which act on the single fruits so as to firstly push them, either totally or partially, out of the tube (through an aperture provided in front of the pit gripping and extracting tool) and to force them between short guiding and centering blocks projecting, at suitable points, from the edge of the tube aperture and pointing to the rear portion of the machine; the internal surface of said blocks is preferably slightly convergent, starting from the edge of said aperture, and the said slides then serve to further push the fruits in order to release them from the said blocks.

(C) To slidably support the plates intended, one to stop the fruits on the return stroke of the pit gripping and extracting tools in order to allow these tools to extract the pit, and the other plate to release the extracted pits from the shanks that have extracted the pits. Thanks to this arrangement, the said gripping shanks can be reduced in length and thus rendered stronger; besides, the length of the machine and the size of the actuating eccentrics can be reduced.

The invention comprises also some modifications, the object of which is:

(1) To make the machine available also for the extraction of the pits from fruits differing in size;

(2) To ensure that in each feeding and distributing tube a single fruit is admitted at a time;

(3) To stop the fruits fallen on the bottom of the feeding and distributing tubes and to hem, by means of slides, the movement of the fruits expelled therefrom;

(4) To ensure that the pitted fruits shall fall and to prevent their getting again into the centering blocks;

(5) To provide the pit gripping and extracting tools with:

(a) A device adapted to compensate for the wear of the parts that rub against each other, thus obviating the necessity of frequent replacements of the wearable parts, viz. the rear shanks of the pincers;

(b) A device for the lubrication of the faces of the stem at the end of which the pincers are pivoted and of the sleeve surrounding the said stem;

(c) Means tending to automatically bring the pincers into open position, yet without hampering the regular work of the pincers.

The accompanying drawings illustrate, merely by way of example, a machine of the abovesaid type provided with the said improvements and comprising four pit gripping and extracting tools along with the corresponding four fruit distributing and separating tubes. The drawings also illustrate the said modifications and improvements in some parts of the machine, relating to the pit gripping and extracting tools.

Though the machine is shown as having four pit gripping and extracting tools, it is obvious that in practice it may comprise a number of such tools, tubes and associated parts greater or smaller than four.

Another object of the invention consists in a device intended to ensure, during the backward stroke of the pit gripping and extracting tools, the separation of the pitted fruits from the fruits in which, owing to an imperfect operation of or to a damage occurred in some of said tools, the pits remain.

In the drawings herewith annexed:

Fig. 5 is a plan view, to a larger scale of the parts controlling the centering slides.

Fig. 6 is an elevated side view, partly in section, of the mechanism controlling the centering slides.

Fig. 7 is an elevation showing a distributing tube with its fruit outlet aperture and with an execution form of the guiding parts for the centering of the fruit.

Fig. 8 is a plan of Fig. 7.

Fig. 9 shows to a larger scale an execution form of the means controlling the reciprocating movement of the sliding plate on the hopper bottom.

Fig. 12 is a front view of the movable plate serving to stop the fruits on the return stroke of the pit extracting tools.

Fig. 13 is a front view of the movable plate serving to release the extracted pits from the gripping ends of the pit extracting tools.

Figs. 14 and 15 show two modifications in the arrangement illustrated by Fig. 7.

Fig. 16 shows the guide for the slides serving to expel the fruits from the feeding and separating tubes, and also indicates a modification to the head of said slides.

Fig. 17 is a similar view to that of Fig. 6.

Figs. 18 and 19 show—in two different working positions—a device serving to ensure that a single fruit at a time will drop into each of the feeding and separating tubes.

Fig. 20 shows in longitudinal elevation a portion of the device shown in side view in Figs. 18 and 19.

Fig. 21 is a plan showing how a pitted fruit, instead of dropping, can be pushed between the centering blocks due to the reaction of the elastic element, against which it is stopped.

Fig. 22 is an elevation, partly in section, of the device serving to prevent the pitted fruits from being thrown between the centering blocks.

Fig. 23 is a general view of the pit extracting tool.

Fig. 24 is a longitudinal axial section of the stem carrying the pincers and head thereof, the pincers being pivoted to this head.

Figs. 25 and 26 show some details in axial section.

Fig. 27 is a front view separately showing the sleeve surrounding the center stem.

Fig. 28 shows the center stem, partly in section.

Fig. 29 is a section along the line VII—VII in Fig. 28.

Fig. 30 shows the front portion of the tool fitted with an improvement, comprising an elastic member.

Fig. 31 is a section along the line VIII—VIII in Fig. 30.

Fig. 32 shows the elastic member in perspective view.

Fig. 33 shows in elevation a first embodiment of the device for separating the pitted fruits from the unpitted ones and in which the operation is actuated by the pit extracted from the fruit.

Fig. 34 is a side view, partly in section along the line IX—IX in Fig. 33, and shows the device in rest position or at the beginning of the actuation phase for the separation of the fruits.

Fig. 35 is a section along the line IX—IX in Fig. 33 and shows the device at the end of the actuation phase for the separation of the fruits.

Fig. 36 shows in elevation a second embodiment of the device mentioned with reference to Figures 33, 34 and 35 and in which the actuation is effected through the intermediary of a movable plate which, after the final phase of the return stroke of the pit gripping and extracting tools, serves also to release the extracted pits from the gripping jaws.

Fig. 37 is a side view, partly in section along the line X—X in Fig. 36, and shows the device in rest position or in the position it occupies at the beginning of the actuation phase for the separation of the fruits.

Fig. 38 is a section along the line X—X in Fig. 36 and shows the device at the end of the actuation phase for the separation of the fruits.

Fig. 39 is a first modification of the device illustrated in Figs. 36, 37 and 38.

Fig. 40 is a partial sectional view along the line XII—XII in Fig. 39 of the device in rest position or in the position it occupies at the beginning of the actuation phase for the separation of the fruits.

Fig. 41 is a section along the line XII—XII in Fig. 39 at the end of the actuation phase for the separation of the fruits.

Fig. 42 is a plan showing a detail.

Fig. 43 is an elevated view of a second modification of the device illustrated in Figs. 36, 37 and 38.

Fig. 44 is a section along the line XIII—XIII in Fig. 43 with the device in rest position or in the position it occupies at the beginning of the actuation phase for the separation of the fruits.

Fig. 45 is a section along the line XIII—XIII in Fig. 43 at the end of the actuation phase for the separation of the fruits.

Figure 1:
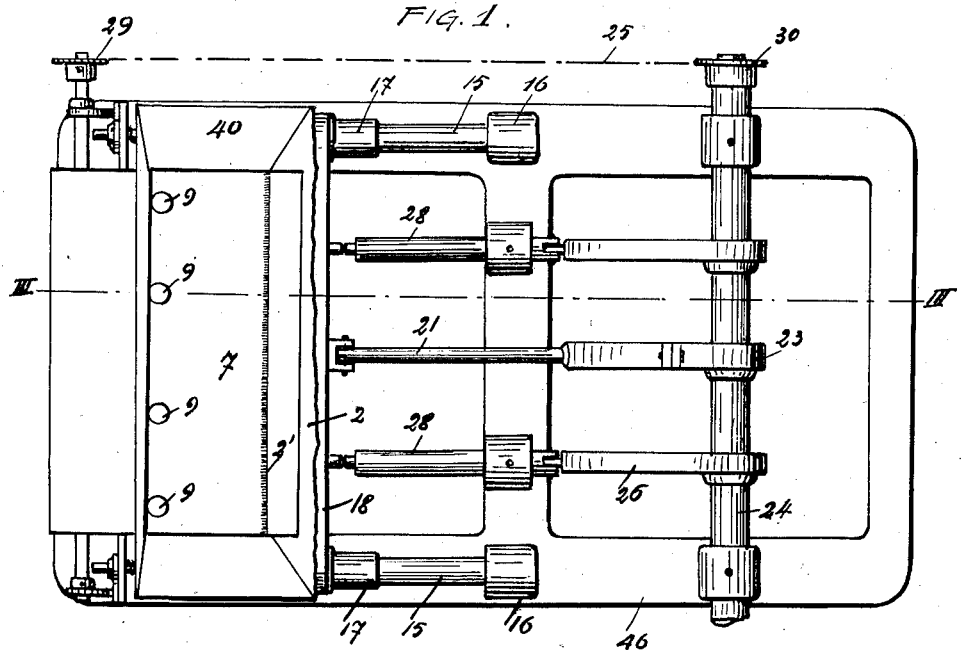
Fig. 1 is a plan view of the machine, with the various parts in the position they occupy at the end of the forward stroke of the carriage, the front portion only of the hopper being shown.
Figure 2:
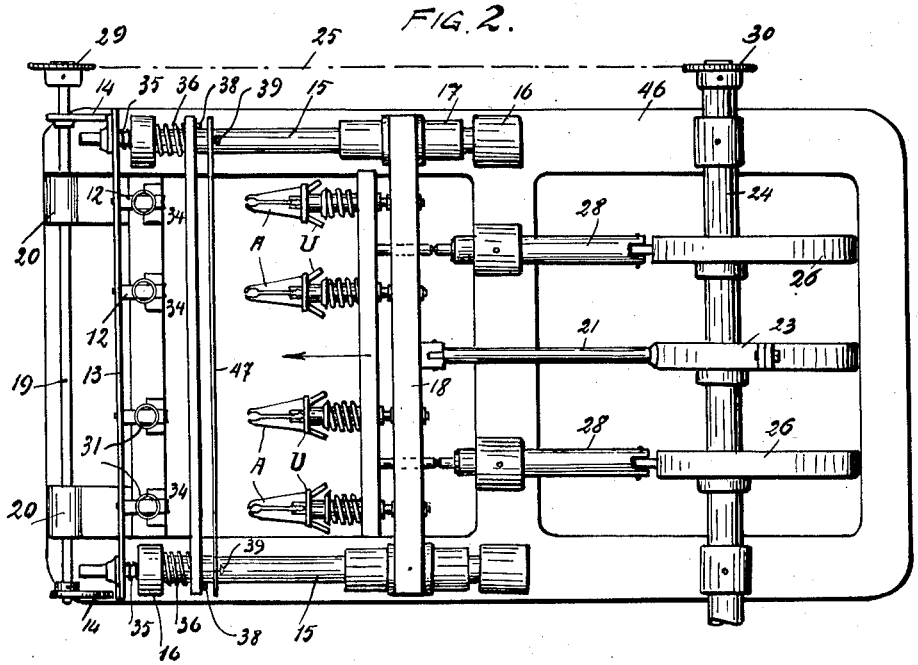
Fig. 2 is a similar view to that of Fig. 1, but with no hopper at all and with the various parts in the position they occupy at the end of the return stroke of the carriage.
Figure 3:
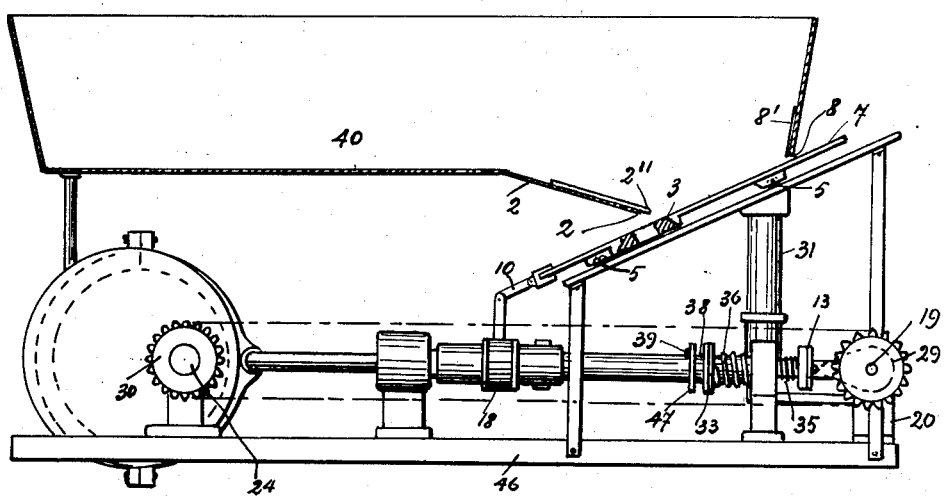
Fig. 3 is an elevated view of the machine as viewed from the control side of the fruit centering slides, the hopper being shown in vertical longitudinal section.

The machine comprises a frame 46; a carriage 18, the opposite ends of which are fixed to two sleeves 17—17 adapted to slide along parallel rods 15—15 carried on brackets 16 projecting from the frame 46; pit gripping and extracting tools of the type comprising pincers, these tools being actuated by eccentrics 26 acting on guided rods 28 and one or more eccentrics 23 and links 21, the latter eccentrics and links controlling also the movement of the carriage 18; tubes 41 with open top end and closed bottom end, having in their bottom end side wall a window 32 facing the pit gripping tools; a hopper 40 with inclined bottom, into which the fruits are delivered haphazard, the stalks having been previously removed from the fruits; a row of holes pierced in the bottom of the hopper 40 and connected to the top open end of said tubes 41; a plate 33 serving to stop the movement of the fruits that have issued from the tubes 31, and a plate 47 serving to release the shanks A of the pit gripping tool, the extracted pits being retained by the plate 33.

One of the improvements forming the object of the invention is illustrated in Figs. 2—3—4—9 of the accompanying drawings. This improvement relates to the means for shaking the fruits delivered into the hopper 40, for separating in the hopper a number of fruits to be carried over the inlet of the various tubes 31 and to be dropped therein. According to this improvement, the hopper has a front portion of its bottom built up of a front plate 1 and a rear plate 2 set at an angle to each other. Obviously any other mutual arrangement for the two plates might be adopted.

The edge 2' of the plate 2 overlaps the plate 1, a narrow and long interstice 3 (Figs. 3 and 4) being left between the edge 2' and the plate 1. To the top side of the plate 2, a flat brush 2'' is fixed (Figs. 1—3—4), the free ends of the brush bristles slightly projecting past the edge 2' and grazing the plate 1. To the inner face of the front side wall of the hopper, a flat brush 8' is secured, the free ends of the brush bristles slightly projecting past the bottom edge of said side wall and grazing the plate 7 (the named bottom edge lies a short distance away from the bottom plate 1 of the hopper, so as to leave a narrow and long interstice 8, alike to the aforementioned interstice 3). In the interstices 3 and 8 are adapted to slide the ends of plate 7.

In the front portion of plate 1, near the front wall of the hopper, holes 4 are pierced (Figs. 4 and 9) equal in number to the tubes 31 and connected to the open or inlet end of these tubes.

In the two opposite side ends of plate 1, parallel guides are formed (Figs. 3—4—9) in which are adapted to roll the rollers 5 (or balls) mounted on a slidable plate 7 (Figs. 1—2—4—9) parallel to plate 1 and arranged a short distance away from the latter. In the plate 7 a plurality of circular holes are formed, the size and arrangement of which are the same as those of the holes 4 in plate 1.

Plate 7 is connected by one or more pivoting links 10 (Figs. 3—4—9) to the carriage 18, on which the pit gripping and extracting tools are mounted. The said tools shown on the drawings are of the type comprising pit gripping means in the form of pincers. Plate 7 is therefore compelled to follow the reciprocating movements of the carriage 18. The connection between the plate 7 and the carriage 18 might also be carried out in a different manner to that illustrated.

Owing to the said connection, when the carriage has reached the end of its forward stroke, the holes 9 in plate 7 register the holes 4 in the bottom plate 1. The plate 7 will cause a shaking of the fruits in the hopper and oblige a number of fruits to fall through the holes 9. These fruits will therefore be entrapped between the edges of the holes 9 so as to be brought over the holes 4 of plate 1, in which position they will fall into the tubes 31.

Another improvement, having for its object to provide the machine with suitable means for expelling the fruits from the tubes 31 and to center them with respect to the pit extracting tools, is illustrated in Figs. 2—8 and 11.

According to this improvement, the tubes 31, in addition to the window 32 facing the said tools, is fitted with a second, diametrically opposite window 11 (Fig. 6) for passage of the slides 12, the longitudinal axis of which is in alignment with the axis of the tool U. One of the ends of the several slides 12 is secured in any convenient manner to a crossbar 13 parallel to the tubes 31 and suitably guided so as to insure a regular and simultaneous movement of all slides 12. For instance, as shown on Figs. 5, 10, 11, one end of each slide 12 has as shank 17 and a partially screwthreaded terminal extension 37'. The non-screwthreaded portion of said extension matching a corresponding window (not shown) formed in the crossbar 13. The non-screwthreaded portion of the extension 37' may be square in section to suit the profile of the window in crossbar 13, in order to prevent the slides 12 from revolving. Nuts 35 adapted to be screwed on the screwthreaded portion of the extension of each slide 12 and to be forcibly tightened against the crossbar 13 serve to secure all slides 12 on this bar.

Figure 11:
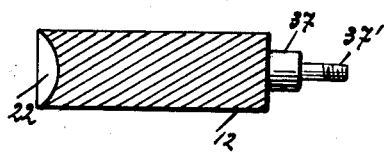
Fig. 11 is an axial longitudinal section of the slide shown in Fig. 10.
Figure 10:
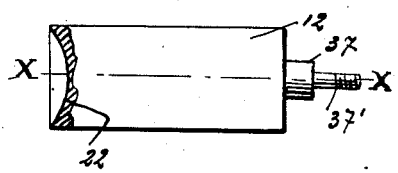
Fig. 10 shows in plan to a larger scale an execution form of the slide acting upon the fruit at the bottom of the distributing tube and controlling the centering of the fruit to be pitted.
Figure 4:
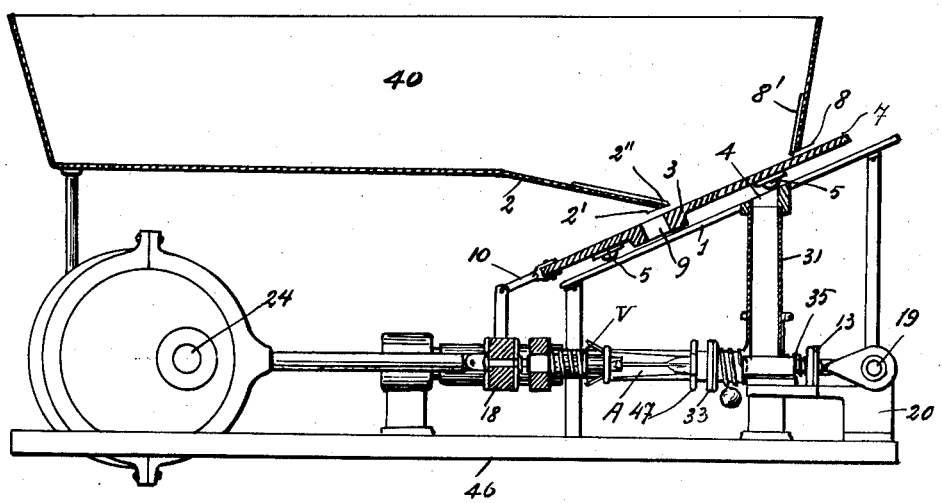
Fig. 4 is a vertical longitudinal section along the line III—III in Fig. 1.

The free end of each slide 12 destined to pass across window 32, tube 31 and window 11, has formed in it a spheroidal recess as shown by way of example in Fig. 10 (plan view) and Fig. 11 (axial longitudinal section along the line visible in Fig. 10).

On a shaft 19 (Figs. 1 to 5) revolving in brackets 20 carried on the machine base plate 46, one or more cams (eccentrics) 14 are keyed, which are all alike and arranged along one and the same radial plane. To one end of shaft 19, a sprocket wheel 29 is keyed which is perfectly alike to a further sprocket wheel 30 keyed to the main shaft 24 of the machine. A chain 25 passing over the sprockets 29 and 30 serves to impart to the shaft 19 a revolving speed equal to that of the main shaft 24. Obviously the described transmission may be provided with a take-up or tightening device (not shown) which may be of any convenient type, for instance a two-bevel wheel mechanism with intermediate shaft.

From two diametrically opposite points of the edge of the window 32 of each tube 31, small blocks 34 project backwardly (that is towards the pit gripping and extracting tools) the opposite faces of which slightly converge towards one another from their root to their outward end.

The blocks 34 may be replaced by other devices. For instance, at the window 32 short tubes of frusto-pyramidal or frusto-conical shape may be fitted to the tubes 31, the inner face of said short tubes being slightly inclined and the axes of the short tubes coinciding with the axes of the pit extracting tools and slides 12. In the case of frusto-pyramidal short tubes, the sides of the polygon forming the major base of the pyramid frustum should be tangentially disposed relatively to the edge of the windows 32; in the case of frusto-conical short tubes (in which the major base of the frustum may be slightly elliptical), the inner periphery of said tubes should be circumscribed to the periphery of the window.

In the drawings (Figs. 10 and 11) parallelipipedous slides 12 are shown (rectangular in cross section), but obviously any other cross section might be adopted, for instance triangular, square, regular or irregular polygon, circular or elliptical.

With reference to the another improvement (as illustrated in the detail Figs. 12 and 13), the plates 33 and 47 are provided, in their end regions, with holes 41—41, respectively 42—42, in which the longitudinal rods 15—15 of the sleeves 17—17 of carriage 18 are a moderate fit. Each hole 42—42 has a notch 42' and through these notches are adapted to pass freely the projections 38 of the rods 15.

The plates 33 and 47, according to the present improvement, are movable and can slide along the rods 15.

The crossbar 33 has several holes 43 formed therein, the centers of which lie on the extension of the axes of the tools. From each hole 43, oblong windows 44 start in radial direction the position of these windows coinciding with the radial position of the gripping shanks of the tools U.

In the crossbar 47, facing the center holes 43 and the slots 44 of the plate 43, apertures are formed of such a shape that they form radial extensions 45 converging towards a point which lies on the extension of the axis of the pit extracting tool; the free ends of these extensions are pointed or nearly so and nearly touch one another.

Springs 36 wound round the rods 15—15 between a fixed shoulder and the plate 33 tend to urge this plate against the stops 38 (Figs. 2—3—5) fixed to the said rods. Between these stops 38 and further stops 39 likewise fixed to the rods 15—15, moves the plate 47.

The machine provided with the improvements thus far described works in the following manner:

Let us assume that the machine is in rest position, in which the carriage 18 and the movable plate 7 have reached the end of their return stroke, and the slides 12 lie outside of the tubes 31, while the cams 14 are in a position nearly ready to actuate the crossbar 33 by which they are connected in order to cause the said slides to move forward.

If the machine be now started:

(a) The carriage 18 will move forward together with the said tools and with the movable plate 7.

(b) The slides 12 will move forward (due to the cams 14 actuating the crossbar 33) so that they will oblige their free end to enter the tubes 31 and cross them in order to expel the fruit lying in front of the window 32 and bring the fruit between the centering means 34.

During this forward movement of the carriage 18, the heads of the pit extracting tools, to which heads the gripping shanks A are pivoted, will encounter the ends of the radial extensions 45 of the plate 47 and this plate, being loosely mounted, will be brought against plate 33. In the further progress of the carriage 18 and said tools, a forward movement (against the action of the springs 36) also of the plate 33 will take place; at the end of the forward stroke, this latter plate will abut against the ends of the centering means 34. The plate 47 can follow the plate 33, because in the edge of its guiding holes 42 a notch 42' is formed through which the projecting stops 38 of the rods 15—15 can freely pass, the said stops limiting the backward movement of the plate 33.

At the end of the forward stroke, the gripping shanks A of the tools U will grip the pits, said shanks penetrating in radial direction into the fruits transported and retained between the centering means 34 by the slides 12.

Likewise, at the end of the forward stroke of the plate 7 actuated by the carriage 18, the holes 9 of said plate in each of which a fruit will have fallen, will register the holes 4 of plate 1, so that the fruits F will fall through the holes 9 into the tubes 31.

On the following return or backward stroke of carriage 18, plate 7 and tools U, these tools during a first portion of the stroke will remain with the gripping shanks A closed and the cams 14 will further move the slides 12 so as to push the fruits F and ensure their release from the centering means 34.

During this return phase, the plate 33 will be urged towards its stops 38 by the springs 36. When the plate 33 has reached the stops 36, the still closed shanks A of the tool U will extract the pit, and the fruit (since it cannot pursue its travel and is free in the space between the plate 33 and the centering means) will drop into an underlying collector (not shown).

In the pit extraction phase, the various pits that have passed through the center holes 43 of plate 33 will encounter the radial extensions 45 of plate 47 and will entrain this plate till it butts against its stops 39. A short time prior to the plate 47 coming into contact with the stops 39, the gripping shanks A of the tools U open and release the pits which, encountering the convergent extensions 45 of the plate 47, will be obliged to drop into an underlying collector (not shown).

On the yet further backward travel of the carriage 18, the slides 12, no longer subjected to the action of the cams 14, will fly out of the tubes 31 under the action of the springs 35 so as to permit a fresh fruit to drop onto the bottom of each of said tubes and a new cycle of operations to be started thereon.

We now proceed to describe the improvements illustrated in Figs. 14 to 22 of the accompanying drawings.

In Figs. 14 and 15, the blocks 34 centering the fruits expelled from the tubes 31 have their opposing faces 34' inclined and either flat (Fig. 14) or curved (Fig. 15), a short lower distance 34" being however left preferably vertical so as to form a guide (Fig. 16) for the slides 12 and to keep centered the fruits of small size. As shown on the drawings, the inclination of the faces or walls 34' is such that the distance between the two is the greatest at the top.

The dotted curved lines F—F'—F" in Figs. 14—15—16 indicate fruits of different sizes which, due to the inclination of the walls 34' of the blocks 34 may be dealt with in one and the same machine.

Referring to Figs. 16 and 17, the head of the slide 12 has not therein the substantially semi-cylindrical recess shown in Figs. 10 and 11; it has, instead, a spherically curved niche 22 in which the curved surface of the fruits pushed by the slides 12 on the forward stroke of the latter tends to accommodate itself. The niche may be concentric with the slide head, or (as shown) it may be eccentric, with the greater eccentricity near to the middle of the lower edge of the slide head.

In order to stop the fruits that have fallen onto the bottom of the tubes 31 and to hem the pushing action exerted by the slides 12 in order to push the fruits out of said tubes, an elastic member 48 is provided between the blocks 34—34 in front of the outlet window of the tubes. The member 48, against which the issuing fruit will impinge, hems the movement of the fruit and prevents the fruit from being thrown beyond the centering guide formed by the inclined walls of the blocks 34 and by the base 46; the member 48 moves in the direction indicated in dotted lines at 48' (Fig. 17).

Referring to Figs. 18—19—20, which illustrate the arrangement intended to prevent that more than one fruit may drop into each feeding tube at a time, 49 is a crossbar the ends of which are fixed to the longitudinal side walls of the hopper 40. The crossbar is fixed in an approximately vertical plane preferably passing through the generating line of the tubes 31 in front of the extracting tools. To the crossbar 49, a plate 50 of elastic material (for instance rubber) is fixed in any convenient manner; at each space separating one tube 31 from the adjacent one the plate 50 has vertical slots 51 in it so that flexible and elastic portions 52 result in front of each tube 31.

From Fig. 18 it will be seen that in the aperture 9 of the plate 7 slidably arranged in the hopper 40 a fruit F has entered and a further fruit F' rests on the former one. Instead, Fig. 19 shows that, when the plate 7 has reached a position in which its aperture 9 registers the bore of the pipe 31, the underlying fruit F is free to fall into said tube, whereas the overlying fruit F' has encountered the elastic portion 52 and is pressed by it against the edge of the aperture 9 and is thus retained. On the return movement of the plate 7, the elastic portion tends to resume its vertical position and follows the fruit till the plate 7 obstructs the bore of the tube 31. Now the fruit F' will be free to fall into the aperture 9 of the plate 7, but will not drop into the tube 31 until the aperture 9 will be carried again into registering position with the bore of the tube.

Referring to Figs. 21 and 22, Fig. 21 shows how the pitted fruit, by effect of the reaction of the center portion (against which it rests) of the plate 33, may sometimes be thrown between the centering blocks 34 instead of dropping into the underlying collector.

Fig. 22 shows a device capable of preventing the fruit from being thrown back between the said centering blocks. The device comprises a cross plate 53 pivoting at 54 in brackets (not shown) carried by the base plate 46 of the machine.

When the plate 33 moves forward in the previously described manner, along with the pit extracting tools, the plate 53 swings about its pivots 54 in the direction indicated by the curved arrow so as to let the tools and the fruit pass freely. When the plate 33 moves backward (in the pit extracting phase), the plate 53 swings in a direction opposite to the one indicated by said arrow and its bottom edge forms a screen preventing the fruit from reaching the blocks 34, so that the fruit will drop into the underlying collector.

In Fig. 22 the movement of the plate 53 is shown as controlled by the movement of the plate 33, which on its forward stroke encounters the plate 53 and swings it about the pivots 54. Obviously, however, the movement may be imparted to the plate 53 by suitable links and mechanisms actuated from the driving shaft of the machine through suitable transmissions. Further, the plate 53 may also be arranged to slide in vertical or inclined direction and the movement thereof may be controlled by mechanisms or eccentrics working at the right time and actuated from the said driving shaft through suitable transmissions.

Referring to Figs. 23 to 32, these figures illustrate certain improvements in pit gripping and extracting tools of the type comprising controllable pincers.

61 is the center stem, on the thickened head of which are radially pivotable at 63 the pit extracting jaws comprising each two shanks that are not aligned but make a certain angle between them.

71 is the tube threaded on the center stem 61 and having at its forward end a cylindrical expansion 69. The forward end of the bore of the tube 71 is widened out so as to form a space 75 for reception of the thickened head of the stem carrying the jaws.

In the annular expansion 69 of the tube 71 radial slots 68 are formed for reception of the rear shanks 65 of the jaws (Figs. 24 and 27).

The outer surface of the expansion 69 of the tube 71 is screwthreaded for reception of a sleeve 82 the internal surface of which is screwthreaded on a short portion only, at its front end. The edge of the rear end of the internal surface of sleeve 82 is slightly rounded off in order to reduce the friction between it and the outer surface of the jaw-shanks 65 (Figs. 24, 25 and 27).

A locking ring 77 (Figs. 23—24—25) is screwed on the front end of the expansion 69.

The complex—sleeve 82 and locking ring 77— constitutes the compensating device for the wear of the surface of the jaw-shanks 65 and of the rear edge of the internal surface of the sleeve 82 which, when working, slide on one another.

In order to compensate for the said wear, the sleeve 82 should be gradually screwed further on upon the expansion 69 each time that a wearing of the said parts is observed and the sleeve 82 should be locked in the new position by means of the locking ring 77. Of course the sleeve 82 as well as the locking ring 77 should be provided with gripping means, such as for instance the notches 83 shown in Figs. 23 and 24 for such tools as may be used in order to revolve them about their axis in either direction so as to screw and unscrew them.

To the rear face of the peripheral flange 74 of the tube 71, one end of a spiral spring (not shown) is attached; the other end of the spring is fixed to the member controlling the displacements of the tube 71 relatively to the stem 61, the said controlling member being fixed by means of a nut screwed on 70. The rear end of the stem 61 is connected and locked to the said controlling member by means of a nut screwed on 76.

The device for the lubrication of the contacting surfaces of the stem 61 and tube 71 is as follows:

The stem 71 is fitted with a blind axial bore 81 starting from the rear end extending close up to the expanded head (Fig. 28).

The open end of said bore is closed by a screw-plug 79 comprising a small valve, for instance of the type commonly known as "Tecalemit" comprising a ball urged by a spring against its set. In the external side surface of the stem 61 an helicoidal groove 78 is formed; a convenient point of this groove (Fig. 28) is connected to the bore 81 by a hole 86.

The consequence is that the lubricant, admitted into the bore 81 of stem 61 through the valve 79, will get through the hole 86 into the groove 78 from whence it will expand itself and lubricate the contacting surfaces of tube 71 and stem 61.

With reference to the modification illustrated in Figs. 30—31—32, in the free end of each shank 65 of the jaws or in an extension of said shanks, a notch is formed (Fig. 30). The various notches are adapted to be engaged by a ring 62, made of elastic material, which as shown in Fig. 30 tends to maintain the front shanks 64 of the pincers in open position. The closing of the jaws is effected, against the action of the said ring 62, by the peripheral bevelling 66 at the front end of the tube 71, which tube in such a case will be fitted neither with the front expansion 69 nor with the sleeve 82 and the lock-nut 77.

The elastic member 62 is shown in the form of a para ring which when mounted in place takes the triangular form shown in Fig. 31; of course, however, the said member may also be constituted by one or more different elastic parts (such as spiral springs, springing rings etc.) adapted to simultaneously act upon all the rear shanks 65 of the jaws.

If wished for, a separate springing or elastic member may be provided for each shank 65.

The working of the tool U is well known so that a description is unnecessary.

Several tools may be mounted on a machine in order to simultaneously pit several fruits.

Of course the constructional and form details may vary in practice without exceeding the limits of the invention. So for instance the tool, instead of comprising three jaws, might comprise only two or more than three. Instead of a single lubricating groove 78, more than one might be provided.

Also the mode of mounting and locking the sleeve 82 on the front end of the tube 71 enclosing the stem 61 might be varied. For instance both the sleeve 82 and the outer surface of the said end of tube 71 might be screw-threaded, and in such a case the sleeve 82 might be a sliding fit on the said end of the tube. In the wall of sleeve 82, one or more slots might be formed, the slots being oblong and inclined relatively to the generating lines of the sleeve. Each slot would be traversed by the shank of a screw engaging a screw-threaded hole formed in the wall of the said tube end. After loosening the screws, the sleeve could then be angularly displaced by causing the slots to slide on the shanks of the said screws; therewith a longitudinal displacement of the sleeve itself will be obtained, such as it is obtained in the case of the screw-mounting system. The locking of the sleeve in the new position is effected by again tightening the screws.

I now refer to the device provided for each pit gripping and extracting tool, by means of which during the return stroke of these tools the separation of the pitted fruits from the still unpitted ones is automatically obtained, no matter whether the failure to extract the pit is due to imperfect working of said tools or to a damage suffered by the gripping jaws.

The main feature of this device consists in the fact that, for obtaining the said separation, the body or mass of the pit extracted from the fruit is utilized, while the said pit is firmly held by the gripping jaws of the tool. The said pit, on striking a member invariably or in any way connected to the separating means, directly or indirectly causes a displacement of the separating means so that the fruit that has been pitted and can freely fall is deviated from the vertical path by the separating means and is directed into a receptacle other than that into which the still unpitted fruits fall freely and in substantially vertical direction.

The device comes into action only in the time interval between the moment in which the tool jaws, together with the gripped pit abandon the fruit, and the moment when the extracted pit is released by the tool jaws.

With reference to the device illustrated by Figs. 33, 34 and 35, 33 is the usual front movable plate which serves to stop the fruits that the pit gripping and extracting tools have withdrawn from the centering and guiding means described on reference to Figs. 2, 6, 7 and 8 and 14 to 18. The plate 33 has large holes 33' in it disposed on the path of the said tools. To the front face of plate 33 an elastic plate 33'' is fixed, this latter plate having the usual center hole 43 in it as well as radial slots 44 equally spaced apart, of which the lower one is vertical and the other two are set at an angle. Through these slots 44 are adapted to permit the passage of the jaws 64 of the pit gripping tools U.

To the lower portion of the plate 33, a block 91 is secured by means of brackets 98, the block being adapted to swing about a pivot 90 supported in the said brackets; rubber washers 99 clamped between the ends of the block and the supporting brackets 98 oppose a certain frictional resistance to the swinging movement of the block. This frictional resistance serves to reduce the vibrations of the device when working.

The block 91 is traversed by two rods 92—92, preferably made of a somewhat elastic material (for instance steel) the top ends 92'—92' of which reach close up to the horizontal diameter of the large aperture 33' provided in plate 33, one rod being on one side and the other on the other side of the vertical diameter of said hole. The rod ends 92'—92' are bent towards the said vertical diameter and remain spaced apart from each other in order to allow the lower jaw 64 of the tool to pass freely therethrough.

The lower portion of the rods 92 is fixed in any convenient manner to the intermediate wall 93' of a canal or chute, the two side walls 93 of which act as lateral guides for the fruits that fall as soon as they are released by the said jaws.

94 (Figs. 34 and 35) is a vertical wall dividing the fruit receptacle (not shown) into two compartments, viz. a front one 96 for the actually pitted fruits and a rear one 95 for the still unpitted fruits.

The device works as follows:

After all the tools have been able to grip the pits of the fruits standing in front of them, the return stroke begins and during this stroke all the fruits F are drawn against the elastic plate 33''. On continuation of the backward movement, the gripping jaws together with the pits traverse the slots 44 and the center hole of the elastic plate so that the pit strikes the bent ends 92'—92' of the rods 92 and causes these rods to swing about the pivot 90. As a consequence, also all the chutes 93—93' swing about the pivot 90 and at the end of their angular displacement their bottom edge will lie beyond the partition wall 94 as shown in Fig. 35. The fruits F that have actually been pitted and released by the tool jaws will therefore drop on to the chutes 93—93' and by these will be deviated from their vertical path and led into the front compartment 96.

Due to the friction of the washers 99 against the block 91, the device will remain in the position shown in Fig. 35 till, on the next forward stroke of the tools, it will be brought again into the position it occupies in Fig. 34 (inoperative or rest position) either by suitable extensions of the tool head or by the rear movable plate (not shown) which at the end of the backward stroke of the tools releases the extracted pits from the tool jaws.

Let us now assume that on the backward stroke one of the tools has not succeeded, from any reason whatever, to remove the pit from the respective fruit.

In such a case the gripping jaws 64 of tool concerned will draw the fruit against the plate 33" in the ordinary way and the jaws will pass freely without acting on the bent ends 92' of the rods 92, so that the device will remain in the position it occupies in Fig. 34. With this position, the chute 93—93' concerned will remain in the position it occupies in Fig. 34 and will allow the fruit to drop vertically into the rear compartment 95 of the receptacle.

In the event of the arrangement of the slots 44 in plate 33 being the reverse of the arrangement illustrated in Fig. 33 (viz. vertical slot in the upper half and the other two slots set at an angle) a single rod 92 may be used instead of two, the rod lying between the two inclined jaws of the tool and the top end of the rod lying on the path of the pit, so that the rod can be actuated by the pit to swing the device.

The two rods 92 may also be replaced by a plate having its top end made in the shape of a fork with the fork tines bent like the bent ends of the rods 92.

Referring to the indirectly actuated device illustrated in Figs. 36 to 38, the usual plate having radial extensions for removing the pits from the jaws is dispensed with and replaced by a plurality of small plates 47 each of which lies in front of a tool and is concentrically arranged with respect to the concentric holes of the plates 33 and 33", against which latter plate stops the fruit that has been drawn backwards by the tool.

Each plate 47 has radial holes in it for passage of the jaws 64; these holes form radial extensions 45 that converge toward the axis along which moves the tool, this axis coinciding with the axis of the holes provided in plates 33 and 33". From the plate 33 in front of each tool extend two or more parallel rods 100, which traverse the corresponding holes provided in the plates 47 as well the sleeves 101 provided at the rear of these holes.

At the free end of each rod 100 an adjustable stop 102 of any desired type is arranged, in order to prevent the plate 47 from slipping past the rod end and in order to adjust the stroke of the said plates.

In lugs formed at the bottom end of each plate 47, is pivotally supported at 90 the upper end of a bar 92, the lower end of which is secured to the intermediate wall of a canal or chute 93. Under each plate 47, a fixed stop 103 is arranged which, as shown in Fig. 37, when the device is in inoperative or rest position, lies at the back of the bar 92 so that the bar rests thereon and keeps the intermediate wall of the chute 93 practically vertical. The stop 103 may consist in a cylindrical crossrod, the ends of which are supported in the machine frame. If desired, where the various bars 93 rest on the rod 103, rollers may be provided in order to reduce the friction and wear of the contacting parts. Besides, in order to prevent the chutes from shaking and jolting when the machine is running at high speed, means may be provided to always maintain the bar 92 in contact with the rest rod 103.

The working of this device is as follows:

When, on the return stroke of the tools, the tool jaws 64 seize a pit each, all the pits encounter the radial extensions 45 of the respective plates 47 and drag these plates in backward direction. In their turn the plates 47, through the intermediary of the pivot 90, exert a dragging action on the bars 92. As these bars rest on the stationary stop 103, the bars 92 and the chutes inwariably connected thereto will be tilted till, at the end of the rearward stroke of the plates 47, the bottom edge of the intermediate wall of the various chutes 93 will have passed beyond the partition wall 94 and lie over the front compartment 96 of the receptacle. Accordingly, the fruits F that have dropped into the chute 93 will roll down along it and be conveyed into the front compartment 96. On the next forward stroke of the tools, the tool head encountering the extensions 45 of the plates 47 brings these plates again into contact with the plates 33 as well as the bars 92 and chutes 93 into their inoperative or rest position (Fig. 37).

Let us now suppose that one of the tools does not work properly or that one of its jaws has been damaged so as not to be able to seize the pit of the respective fruit. In such a case, on the backward stroke of the tools the jaws of the tool concerned will pass freely without actuating the corresponding plate 47, so that the corresponding bar 92 and chute 93 will remain at rest. The fruit F, as soon as it is released by the tool jaws, will drop vertically into the rear compartment 95 of the receptacle, being guided by the side walls of the chute 93.

With reference to the modified construction illustrated by Figs. 39 to 42, the parts 47—45—100—101—102 in these figures are alike to and perform the same duty as the parts bearing the same numerals in Figs. 36 to 38.

The alteration consists in the fact that from the bottom edge of the plate 47 a further plate extends in forward direction, the portion 104 of which is substantially horizontal whereas the end portion 93 is inclined. In the horizontal portion 104 a large aperture 105 is formed, through which any still unpitted fruit will pass and drop into the underlying rear compartment 95 of the receptacle.

On the contrary, when the pit 97 is actually extracted from the fruit, the plate 47, and therewith also the portions 104 and 93, are drawn backwards into the position shown in Fig. 42, so that the fruit will drop onto the incline 93 and be conveyed by it into the front compartment 96 of the receptacle.

Of course the incline 93 may be provided with guiding side walls.

Referring now to the modified construction illustrated in Figs. 43 to 45, also here the parts 47—45—100—101—102 are alike to and perform the same duty as the parts bearing the same numerals in Figs. 36 to 38.

To the bottom edge of plate 47 is pivotally attached at 90 one side of a rectangular ring 92 in which the side opposite to the pivot 90 has pivotally attached to it at 106 the upper end of a plate 93 adapted to freely swing about a fixed pivot 103. The pivot 103 may be an horizontal cylindrical rod extending transversely of the machine and having its ends fixed in the longitudinal beams of the machine frame.

If desired, the plate 93 may be fitted with side walls so as to form a canal or chute.

In the return phase of the tool whose jaws have seized the pit, the pit will move the plate 47 from the position shown in Fig. 44 into the position shown in Fig. 45. During this motion the plate 93, by means of the rectangular ring 92, will be caused to swing about the pivot 103 and will be moved from the position shown in Fig. 44 into the position shown in Fig. 45 in which latter its lower forward end will lay itself against the stop 108. With this position the fruit dropping onto the plate 93 will be conveyed into the forward compartment 96 of the receptacle.

On the next forward stroke of the tools, the plate 47 and therewith also the plate 93 will be brought again into the position they occupy in Fig. 44.

Let us now assume that a fruit has remained unpitted. In such a case, on the return stroke the tool concerned will freely pass through the holes 45 of the plate 47 without displacing this plate. The fruit F still containing the pit will therefore fall through the rectangular ring 92 into the underlying rear compartment 95 of the receptacle.

107 is a transverse plate, at the back of which the pits 97 that have been extracted from the fruits fall into a separate receptacle.

With all the devices and their modifications described above and illustrated in the accompanying drawings a directly or indirectly operated automatic separation is assured of the pitted fruits from the still unpitted ones.

Of course the constructional and form details described and illustrated are to be understood merely as possible embodiments of the invention, that have been indicated only for illustration and not for limitation purposes. It must be understood that in the compass of the invention are comprised all those mechanical alterations and all those constructive improvements that may be suggested by practice in order to achieve the object aimed at by the present invention by means of parts that are, either directly or indirectly, actuated by the pits gripped by the gripping jaws and during the lapse of time interceding between the moment the pit leaves the fruit and the moment the pit is released by the gripping jaws.

Having now particularly described and ascertained the nature of my said invention and in what manner the same is to be performed, I declare that what I claim is:—

1. A machine for removing pits from fruits, including the combination, with a hopper for receiving the fruit haphazard, a plurality of fixed vertical fruit separating tubes below said hopper adapted to receive therefrom the fruits to be pitted, a reciprocating carriage having pit gripping and extracting pincers mounted thereon and provided with cooperating jaws, and means for reciprocating said carriage in order to reciprocate said pincers, of a reciprocating member interposed between the main portion of said hopper and the upper open extremities of said separating tubes having means therein for shifting the fruits individually to positions directly over said upper extremities of the tubes so that the fruits thus shifted will drop into said tubes, an elastic member mounted in said hopper above said reciprocating member and spaced above each tube in order to pass solely one fruit at a time to said tube, the lower end of each tube having a pair of diametrically opposite openings in the side walls thereof with one opening disposed in line with one set of pit gripping and extracting pincers, fixed guide means associated with said one opening for directing indivdual fruits toward said pincers, a reciprocating pushing member passing transversely through each tube into the other side opening thereof and adapted to push a fruit out from the tube past said guide means toward the pincers, means tending to impede the movement of the fruit from each tube past said guide means, means for operating the jaws of said pincers, movable yielding stop means interposed between the jaws of the pit gripping and extracting pincers and the fixed fruit guide means for yieldingly stopping and retaining the fruits in position during the pit extracting operation of said pincers, recoil preventing means interposed between said movable stop means and said fixed fruit guide means tending to both block recoil of pitted fruit from said movable stop means toward said guide means upon release of the fruit by withdrawal of the pits therefrom and cause said pitted fruit to drop in predetermined manner, additional movable means disposed between said movable stop means for releasing extracted pits from the jaws of the pincers, fruit selecting means actuated by extracted pits held in the jaws of said pincers and effective to separate the pitted fruits from those which still remain unpitted subsequent to the pitting operation, compensating means permanently associated with said pincers to take up wear, and resilient means upon said pincers resiliently tending to open the jaws of said pincers.

2. A machine according to claim 1, wherein a plate forms the bottom proper of the hopper and is connected to the upper ends of the vertical tubes and provided with apertures individually corresponding with said tubes, and wherein the reciprocating member is a slidable plate of practically the same width as the hopper bottom plate and the means for shifting the fruit over the tubes comprise a row of fruit-selecting apertures which in one position of the slidable plate register with the apertures in the hopper bottom plate and with the upper ends of the tubes, there being openings in the sides of said hopper above the bottom plate thereof forming clearances for the ends of said slidable plate, anti-friction means upon said slidable plate, guides for said slidable plate in the lower portion of said hopper, while the elastic member in said hopper spaced above each tube is transversely disposed with respect to the direction of movement of the slidable plate beneath the same in order to prevent upper strata of fruit from following the individual fruits which have dropped into the selecting apertures in said plate during each cycle of movement, and means imparting a complete forward and return movement to the slidable plate during each complete cycle of operations of said machine.

3. A machine according to claim 1, wherein the opening in the side wall at the bottom of each tube is so proportioned that solely one fruit can be pushed out at a time from within the tube past the guide means toward the pincers, means periodically driving and withdrawing the reciprocating pushing member transversely through the bottom portion of each tube comprising a crossbar to which all of the pushing members are attached, springs urging said crossbar toward withdrawn position of the pushing members in order to hold the latter normally outside the tubes in idle position, a driven shaft rotatably mounted in parallelism with said crossbar and carrying a cam making contact with at least a portion upon said crossbar and moving the same against the urging of said springs in order to cause the pushing members to enter the sides of the tubes and displace the fruits in the bottom portions thereof, and an elastic member disposed adjacent to the guide means at the bottom openings in said tubes forming the impeding means for the fruits while being pushed past the guide means toward the pincers.

4. A machine according to claim 1, having parallel stationary rods slidably supporting the reciprocating carriage upon which the pit extracting pincers are mounted, in which machine the movable yielding stop means for the fruits includes a plate having yielding portions and slidably mounted upon said parallel rods and also having apertures in line with the pincers allowing the same to pass a distance therethrough, stop members upon said rods limiting movement of said fruit stop plate in one direction, in which machine also the additional movable means for releasing extracted pits from the pincers comprises a second plate also mounted upon said parallel rods and also having apertures through which the pincers may pass and further having clearance portions adjacent the rods adapting said second plate to pass said stop members thereon, springs urging the first fruit stop plate against said stop members and tending to cause said plate to push the second plate past the stop members, and wherein the recoil preventing means comprises a third plate mounted to be movable on said machine and being controlled by displacements of said first two plates, while displacement of said first two plates is controlled by forward movement of said pincers which during such movement first engage the second plate and move the same and also the first fruit stop plate, and cause movement of the third plate by the recoil of the pitted fruit from the first plate upon withdrawal of the pits therefrom during return movement of the pincers through said first plate.

5. A machine according to claim 1, having means for operating and controlling the pit extracting pincers and for maintaining said means in operative condition, comprising a stem for each set of pincers which has two or more cooperating jaws pivoted to the front end thereof, a sleeve threaded upon said stem and displaceable relatively thereto, means for effecting the opening and closing of said jaws, rotatable eccentrics and links actuating said jaw opening and closing means, there being a blind axial bore in said stem extending close to the front end thereof, at least one exterior lubricating groove which may be helical in form disposed upon the stem communicating by an aperture with the interior blind bore and a closing valve for said blind bore through which lubricant may be admitted.

6. A machine according to claim 1, having means for operating and controlling the pit extracting pincers, comprising a stem for each set of pincers which has two or more cooperating jaws pivoted to the front end thereof, a sleeve threaded upon said stem and displaceable relatively thereto, means for effecting the opening and closing of said jaws, rotatable eccentrics and links actuating said jaw opening and closing means, a relatively thick cylindrical flange provided on the front end of said sleeve being formed with radial slots wherein the bottoms are inclined toward the axis of the sleeve in the direction toward the front end thereof, a rear shank upon each pincer jaw disposed in each of said radial slots, a screw thread upon said flange, an adjusting ring screwed on said thread and adapted to be screwed off or on said thread to a greater or lesser extent in order to adjust the angular displacement of said pincer jaws and constituting the means adapted to compensate for wear of the same, and a locking ring for fixing the adjusting ring in position.

7. A machine according to claim 1, having means for operating and controlling the pit extracting pincers, comprising a stem for each set of pincers which has two or more cooperating jaws pivoted to the front end thereof, a sleeve threaded on said stem having a peripheral bevel upon the forward end thereof, a rear shank upon each pincer jaw resting upon the bevel of said sleeve, and an elastic means of rubber mounted upon the rear shanks of the jaws of each set of pincers tending to bring said shanks together and open said jaws, said sleeve being movable forward to bring the bevel thereof into contact with and to thereby separate the rear shanks of said jaws in order to close said jaws, the latter opening again upon withdrawal of said sleeve.

8. A machine according to claim 1, having means for operating and controlling the pit extracting pincers, comprising a stem for each set of pincers which has two or more cooperating jaws pivoted to the front end thereof, a sleeve threaded upon said stem and displaceable relatively thereto, means for effecting the opening and closing of said jaws, rotatable eccentrics and links actuating said jaw opening and closing means, a relatively thick cylindrical flange provided on the front end of said sleeve being formed with radial slots wherein the bottoms are inclined toward the axis of the sleeve in the direction toward the front end thereof, a rear shank upon each pincer jaw disposed in each of said radial slots, a screw thread upon said flange, an adjusting ring threaded on said thread being formed with one or more similarly inclined elongated slots in the wall thereof, there being threaded screw holes radially disposed in said flange on said sleeve, and screws passing through the elongated slots in said adjustment ring and screwed into the screw holes in said flange, the adjusting ring being slightly rotatable when the screws are loosened, within the limits of said elongated slots, while being fixed in attained position by said screws when the latter are tightened.

9. A machine according to claim 1, wherein the fruit selecting means are actuated by the extracted pit held in the closed jaws of each set of pincers subsequently to withdrawal of said pit from the fruit and prior to release of said pit by said jaws, and are shifted thereby so as to be effective to automatically direct pitted fruits to predetermined position while remaining inactive when a fruit remains unpitted subsequent to the pitting operation by lack of a pit in the jaws to actuate said fruit selecting means.

10. A machine according to claim 1, wherein the fruit selecting means comprises a movable member having means connected thereto adapted to be directly engaged by an extracted pit held in the closed jaws of each set of pincers and thereby actuating said movable member, a normally vertical deflecting member capable of being inclined by said movable member when actuated by the extracted pit in the pincers and inclined position deflecting and guiding the travel of the pitted fruit during descent thereof from the yielding fruit stop in predetermined manner into one final position, while remaining idle in vertical position when no pit is in the jaws subsequent to the pitting operation and then allowing an unpitted fruit to fall into another separate final position.

11. A machine according to claim 1, wherein the fruit selecting means comprises a pendent fruit deflecting plate swingable about a horizontal axis and provided with one or more contact members both extending rigidly upward therefrom and adapted to be directly engaged by an extracted pit when held in the jaws of one set of pincers subsequent to the extraction thereof from a fruit while said members themselves clear said jaws at all times, whereupon said deflecting plate is swung from normal vertical position to an inclined position wherein it deflects a falling pitted fruit into a predetermined final position intended solely for pitted fruits, and a pivot for said contact members and fruit deflecting plate mounted in a pair of extensions upon the yielding fruit stop member.

12. A machine according to claim 1, wherein the fruit selecting means comprises a pendent fruit deflecting plate swingable about a horizontal axis and provided with one or more contact members both extending rigidly upward therefrom and adapted to be directly engaged by an extracted pit when held in the jaws of one set of pincers subsequent to the extraction thereof from a fruit while said members themselves clear said jaws at all times, whereupon said deflecting plate is swung from normal vertical position to an inclined position wherein it deflects a falling pitted fruit into a predetermined final position intended solely for pitted fruits, a pivot for said contact members and fruit deflecting plate mounted in a pair of extensions upon the yielding fruit stop member, and means for minimizing the vibrations of fruit deflecting plate.

13. A machine according to claim 1, wherein the fruit stop member consists of a movable plate provided with parallel guide rods rigidly extending in the direction of the pit extracting pincers, and wherein the pit releasing additional movable means comprises a second plate having guide sleeves slidable upon said rods and perforated to allow solely the pit extracting pincers to pass therethrough but having converging extensions clearing the pincer paws but engaging extracted pits held in the jaws of said pincers, in which machine also, the fruit selecting means comprises a pendent plate hinged to the lower portion of said second plate, and a stationary stop disposed rearwardly of the pendent plate in the path thereof so that upon rearward movement of said second plate, said pendent plate will strike and slide in inclined position upon said stop in order to deflect pitted fruit in descent from the first movable plate and guide the same into a predetermined final position intended for the pitted fruits.

14. A machine according to claim 1, wherein the fruit stop member consists of a movable plate provided with parallel guide rods rigidly extending in the direction of the pit extracting pincers, and wherein the pit releasing additional movable means comprises a second plate having guide sleeves slidable upon said rods and perforated to allow solely the pit extracting pincers to pass therethrough but having converging extensions clearing the pincer jaws but engaging extracted pits held in the jaws of said pincers, in which machine also, the fruit selecting means comprises a forwardly inclined plate rigidly connected to said second plate by an intermediate plate having a sufficiently large aperture to pass an unpitted fruit, so that an extracted pit in the jaws of the pincers will engage said second plate and move said inclined plate beneath a pitted fruit and deflect the same in descent into a predetermined position intended for pitted fruits, while the intermediate plate will allow an unpitted fruit to fall through the aperture therein when a pit is absent from the pincers.

15. A machine according to claim 1, wherein the fruit stop member consists of a movable plate provided with parallel guide rods rigidly extending in the direction of the pit extracting pincers, and wherein the pit releasing additional movable means comprises a second plate having guide sleeves slidable upon said rods and perforated to allow solely the pit extracting pincers to pass therethrough but having converging extensions clearing the pincer jaws but engaging extracted pits held in the jaws of said pincers, in which machine also, the fruit selecting means comprises a horizontally pivoted and swingable deflecting plate connected adjacent to one end to the lower portion of said second plate by means of an open frame having a clearance which will allow an unpitted fruit to drop past the same when the second plate remains idle for lack of an extracted pit in the jaws of the pincers subsequent to the pitting operation, but when said pincers hold an extracted pit in the jaws thereof, said pit will engage said second plate so as to move the same and by means of said open frame will swing said pivoted deflecting plate into inclined position below a pitted fruit so as to deflect and guide the same in its descent into a predetermined final position solely intended for pitted fruits.

16. A machine according to claim 1, wherein the fixed fruit guide means associated with one of the side openings of each of the fruit separating tubes are provided with downwardly converging inner side walls adapting said guide means to center various sizes of fruit ejected past the same from said tubes.

17. A machine according to claim 1, wherein each reciprocating member which pushes the fruit out of the opening of the lower end of the corresponding vertical fruit separating tube to carry said fruit past the guide means towards the corresponding pit-extracting pincers, is provided with a concave surface at the end abutting against and pushing the fruit concerned.

GIOVANNI FROVA.